US008265415B2

(12) United States Patent
Choi et al.

(10) Patent No.: US 8,265,415 B2
(45) Date of Patent: Sep. 11, 2012

(54) APPARATUS AND METHOD FOR TRANSFORMING IMAGE IN MOBILE DEVICE

(75) Inventors: Yoon-Seok Choi, Daejeon (KR); Bon Ki Koo, Daejeon (KR); Ji Hyung Lee, Daejeon (KR); Bo Youn Kim, Daejeon (KR); Hee Jeong Kim, Daejeon (KR); Il Kyu Park, Daejeon (KR); Seung Wook Lee, Daejeon (KR); Seung Hyup Shin, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 937 days.

(21) Appl. No.: 12/314,857

(22) Filed: Dec. 17, 2008

(65) Prior Publication Data

US 2009/0154841 A1    Jun. 18, 2009

(30) Foreign Application Priority Data

Dec. 17, 2007 (KR) .................. 10-2007-0132680

(51) Int. Cl.
*G06K 9/40* (2006.01)
*G06K 9/54* (2006.01)
(52) U.S. Cl. ........................ 382/264; 382/307
(58) Field of Classification Search .................. 382/264, 382/260, 266, 276, 277, 307
See application file for complete search history.

(56) References Cited

U.S. PATENT DOCUMENTS

| 6,608,627 B1 | 8/2003 | Marshall et al. | |
| 2003/0156753 A1* | 8/2003 | Fan et al. | 382/167 |
| 2004/0202377 A1* | 10/2004 | Murakami | 382/251 |
| 2006/0001758 A1 | 1/2006 | Nam et al. | |
| 2007/0002366 A1 | 1/2007 | Wang | |
| 2008/0181528 A1* | 7/2008 | Rising | 382/264 |

FOREIGN PATENT DOCUMENTS

| KR | 2003-0026683 | 4/2003 |
| KR | 10-2005-0018256 | 2/2005 |
| KR | 10-2006-0032822 | 4/2006 |
| KR | 10-0700101 | 3/2007 |

OTHER PUBLICATIONS

"Human Facial Illustrations: Creation and Psychophysical Evaluation", Bruce Gooch et al., ACM Transactions on Graphics, vol. 23, No. 1, pp. 17-44, Jan. 2004.
"Real-Time Vido Abstraction", Holger Winnemöller et al., ACM SIGGRAPH 2006 Papers, pp. 1221-1226, Jul. 31, 2006.

* cited by examiner

*Primary Examiner* — Yon Couso
(74) *Attorney, Agent, or Firm* — Staas & Halsey LLP (57) ABSTRACT

An apparatus for transforming an image in a mobile device is disclosed. The apparatus comprises a pen style transformation unit for transforming an original image to a pen style image using a separated Gaussian filter and outputting pen style image, a cartoon style transformation unit for transforming the original image to a cartoon style image and outputting the cartoon style image, a mosaic creation unit for creating a photomosaic to which the original image is applied based on an optimum photo image set and outputting the created photo mosaic by applying the created photo mosaic to the original image, and an image output unit for outputting the images output from the pen style transformation unit, the cartoon style transformation unit, and the mosaic creation unit to an output unit.

10 Claims, 14 Drawing Sheets

APPARATUS AND METHOD FOR TRANSFORMING IMAGE IN MOBILE DEVICE

CROSS-REFERENCE(S) TO RELATED APPLICATIONS

The present invention claims priority of Korean Patent Application No. 10-2007-0132680, filed on Dec. 17, 2007, which is incorporated herein by reference.

FIELD OF THE INVENTION

The present invention generally relates to an apparatus and a method for transforming an image in real time to which an artistic effect of the image is applied in a mobile device.

This work was supported by the IT R&D program of MIC/IITA. [2005-S-082-03, Development of Non-Photorealistic Animation Technology]

BACKGROUND OF THE INVENTION

Many studies on transformation technologies for colors and artistic effects of two-dimensional images are being made, and utility programs, such as MS Paint (Microsoft Windows), Adobe Photoshop, Corel Paint Shop Pro and the like which have various functions are being widely used.

In recent years, due to a boom in user created content (UCC), after many people move pictures taken by their own mobile phone cameras or digital cameras to their laptop computers or desktop computers, they transform images using their graphic tools such as MS Paint, Adobe Photoshop, Corel Paint Shop Pro and the like, and exhibit the images in a web environment to share their UCCs with many other people.

Meanwhile, due to distribution of wireless communication environments such as IMT-2000 and WiBro, pictures taken by mobile phone cameras or digital cameras can be immediately exhibited in a web space using wireless communication.

Accordingly, mobile devices such as mobile phones and PDA (Personal Digital Assistant)s provide various functions, for example, functions of transforming simple colors such as black and white and a sepia tone, for editing pictures.

However, mobile devices only provide simple edition functions owing to restrictions on hardware environments but cannot provide non-realistic rendering technologies such as cartoons and pen styles as in personal computers.

SUMMARY OF THE INVENTION

It is, therefore, an object of the present invention has been made in view of the above problems, and the present invention provides an apparatus and a method that are optimized for a method for improving speed to realize artistic effects such as pen style, cartoon, and photo mosaic in a mobile device environment and a hardware structure of a mobile device.

In accordance with one aspect of the present invention, there is provided an apparatus for transforming an image in a mobile device, the apparatus includes a pen style transformation unit for transforming an original image to a pen style image using a separated Gaussian filter and outputting the pen style image, a cartoon style transformation unit for transforming the original image to a cartoon style image and outputting the cartoon style image, a mosaic creation unit for creating a photo mosaic to which the original image is applied based on an optimum photo image set and outputting the created photo mosaic by applying the created photo mosaic to the original image, and an image output unit for outputting the images output from the pen style transformation unit, the cartoon style transformation unit, and the mosaic creation unit to an output unit. The separated Gaussian filter includes a horizontal Gaussian blur filter and a vertical Gaussian blur filter. The pen style transformation unit includes a means for calculating an intermediate value by applying the horizontal Gaussian blur filter to the original image, and a means for calculating a final value by applying the vertical Gaussian blur filter to the intermediate value. The pen style transformation unit includes a temporary memory space having rows and columns of a size of m by l obtained by transposing rows and columns of a size of l by m of the original image, a means for storing in the temporary memory space a transposed intermediate value obtained by transposing the rows and columns of the intermediate value, and a means for calculating the final value by applying the vertical Gaussian blur filter in a direction of the rows of the temporary memory space to the transposed intermediate value. The cartoon style transformation unit includes a smoother for smoothing the original image, a quantizer for quantizing the smoothed original image and classifying the smoothed original image into steps depending on colors thereof, a contour extractor for extracting contours of spaces for the colors, an abstractor for abstracting the contours extracted by the contour extractor, and a cartoonizer for creating a cartoon image using information about the abstracted contours and information about the original image and for outputting the created cartoon image to the output unit. The cartoon style transformation unit further includes an edge extractor for extracting edge information from the smoothed image. The cartoonizer combines the edge information with the cartoon image and outputs the cartoon image combined with the edge information to the image outputter. The cartoon style transformation unit further includes an edge abstractor for abstracting the edge information extracted by the edge extractor. The cartoon style transformation unit combines the abstracted edge information with the cartoon image and outputs the cartoon image combined with the abstracted edge information to the image output unit. The smoother reduces the original image at a specific ratio and then smoothes the original image. The quantizer restores a size of the smoothed image to a size of the original image, and then quantizes the smoothed original image. The optimum photo image set is a set of images extracted from an image set for creation of an entire mosaic through a featured image extraction optimizing technology.

In accordance with another aspect of the present invention, there is provided a method for transforming an image in a mobile device, the method includes creating an intermediate image by applying a horizontal Gaussian blur filter to an original image when the original image is to be converted to a pen style image using a separated Gaussian filter, and creating a final image by applying a vertical Gaussian blur filter to the intermediate image. The method further includes allocating a temporary memory space having a size of m by l obtained by transposing rows and columns of a size of l by m of the original image, and storing in the temporary memory space a transposed intermediate value obtained by transposing rows and columns of the intermediate image. In the creating the final image, the final image is created by applying the vertical Gaussian blur filter in a direction of rows to the intermediate image stored in the temporary memory space.

In accordance with still another aspect of the present invention, there is provided a method for transforming an image in a mobile device, the method includes smoothing an original image when the original image is to be converted to a cartoon style image to be output, quantizing the smoothed original image and classifying the smoothed original image into steps depending on colors thereof, extracting contours of spaces for the colors and abstracting the extracted contours, and creating a cartoon image using information about the abstracted contours and information about the original image. The method further includes extracting edge information from the smoothed image and abstracting the edge information, and creating a final image by combining the abstracted edge image with the cartoon image. In the smoothing the original image, the original image is scaled down at a specific ratio and then the scaled-down original image is smoothed. In the classifying the smoothed original image into steps, a size of the smoothed image is reduced to a size of the original image, and then the smoothed image is quantized.

In accordance with the present invention, images of various effects can be directly created by providing artistic transformation technologies, such as pen style transformation, cartoon style transformation, and photo mosaic that may be applied to mobile devices widely distributed to people.

In addition, a UCC of one's own can be created in real time and can be enrolled in web environment by being combined with a wireless Internet environment such as WiBro since the present invention supports a real time creation environment of an image obtained in the field by a user of a mobile device.

BRIEF DESCRIPTION OF THE DRAWINGS

The above and other objects and features of the present invention will become apparent from the following description of embodiments given in conjunction with the accompanying drawings, in which.

DETAILED DESCRIPTION OF THE EMBODIMENTS

Hereinafter, exemplary embodiments of the present invention will be described in detail with reference to the accompanying drawings. Detailed descriptions of well-known functions and structures incorporated herein may be omitted to avoid obscuring the subject matter of the present invention.

In the embodiments of the present invention, are described a system and a method for applying non-realistic rendering technologies such as pen stylization, cartoonization, and photo mosaic of a 2D image to a mobile device in real time.

Figure 1:
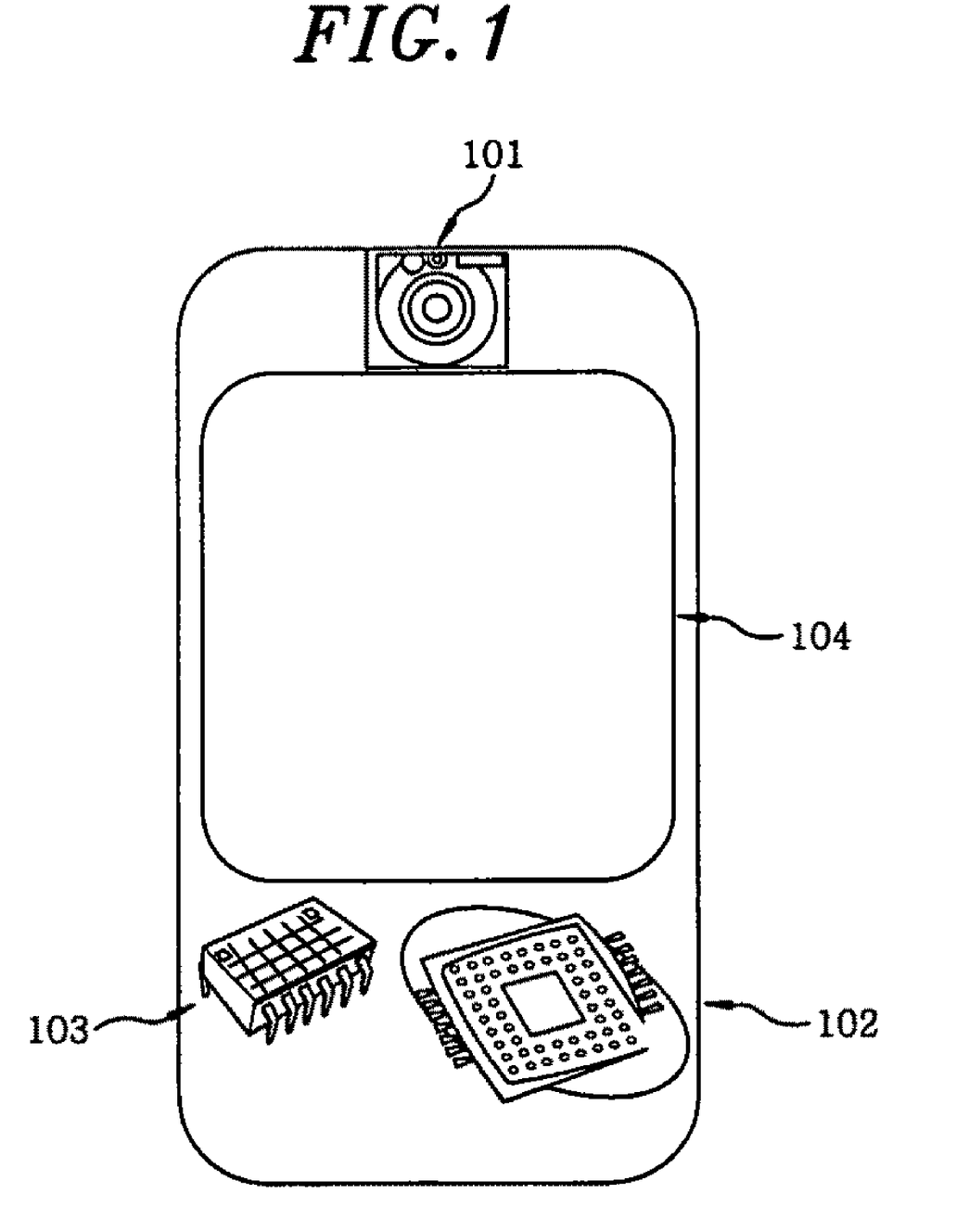
FIG. 1 is a view illustrating the entire service system in accordance with an embodiment of the present invention.

FIG. 1 is a view illustrating a service system of a mobile device environment to which the present invention is applied. The service system includes a camera 101 mounted to the mobile device, an image transformation processor 102, a storage medium 103 storing an image, and an output unit 104 outputting both images before and after processing of the image transformation processor 102. After the image obtained by the camera 101 is stored in the storage medium 103, it is transformed through the image transformation processor 102. The transformed image is stored in the storage medium 103 and is displayed on the output unit 104.

Figure 2:
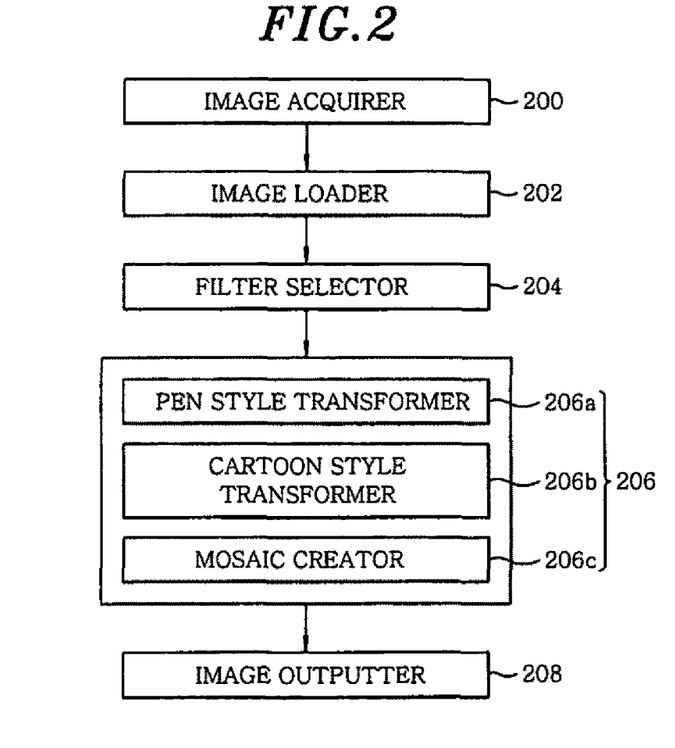
FIG. 2 is a functional block diagram illustrating the internal structure of an apparatus for creating an image which uses the artistic effect transformation technology of the service system in accordance with the embodiment of the present invention.

FIG. 2 is a block diagram illustrating the internal structure of the image transformation processor of the mobile device of the system in accordance with the embodiment of the present invention.

As in FIG. 2, the image transformation processor 102 of the mobile device includes an image acquirer 200 acquiring an image from the camera 101 mounted to the mobile device and storing the image in the storage medium 103, an image loader 202 loading the image 103 stored in the storage medium 103 of the mobile device, a filter selector 204 providing an interface by which an artistic effect transformation filter applied to the loaded image (original image) is selected, an image transformer 206 transforming the image by applying the selected filter, and an image outputter 208 creating a transformed image using the selected transformation filter, storing the created image in the storage medium 103 and displaying the created image on the output unit 104.

The image transformer 106 includes a pen style transformer 206a transforming the original image into a pen style using a separated Gaussian filter and outputting the transformed original image to the image outputter 208, a cartoon style transformer 206b transforming the original image into a cartoon style and outputting the transformed original image to the image outputter 208, and a mosaic creator 206c creating a photo mosaic that is to be applied to the original image based on an optimum photo image set, applying the created photo mosaic to the original image, and outputting the original image to the image outputter 208.

Figure 3:
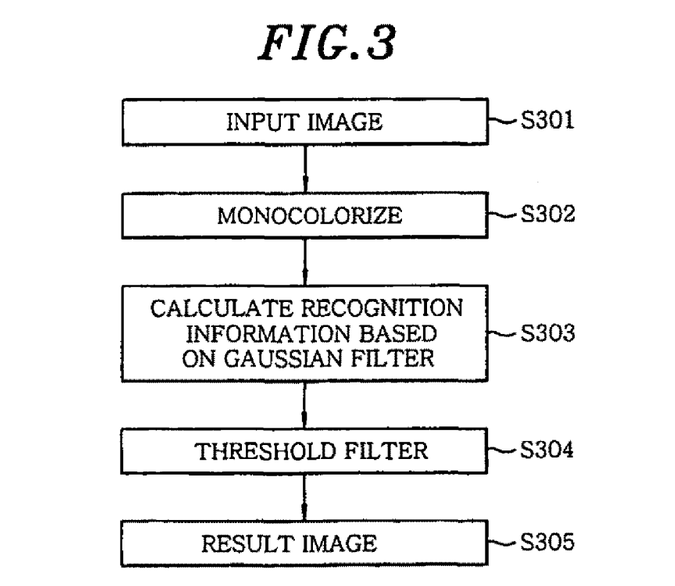
FIG. 3 is a flowchart illustrating a pen style transformation procedure of the artistic effect transformation technology of the service system in accordance with the embodiment of the present invention.

FIG. 3 is a flowchart illustrating a pen style transformation procedure of the artistic effect transformation technology of the service system in accordance with the embodiment of the present invention. The pen style transformation is carried out through driving of the pen style transformer 206a of the image transformer 206.

The pen style transformation is based on an illustration technology for creating a brightness perception based black and white image that was exhibited in a caricature creation technology in 2004 by Bruce Gooch et. al. The technology is composed of three basic operations of differentiation, integration, and thresholding, applies Gaussian blur filters of two different sizes to the original image to calculate the difference between two images, increases the size of the Gaussian blur filter by 1.6 times to repeat the same operations several times, and integrates the differences. Filtering is applied to the integrated result with reference to a specific threshold value to create a final image. In this case, the ratio between the sizes of the two different Gaussian filters is designated to be 1.6, which is borrowed from Marr's technology. The entire algorithm is based on a human brightness perception model of Blommaert and Martens.

As in FIG. 3, if an image is loaded (S301), the pen style transformer 206a of the image transformer 206 transforms an input image to a mono-color image, i.e. a grey image (S302).

Thereafter, the pen style transformer 206a collects recognition information by applying a Gaussian filter to a mono-color image (S303), apply the collected recognition information to a threshold filter (S304) and creates a final image (S305).

The detailed algorithm applied by the pen style transformer 206a is as follows.

```
SrcImage : Input image
GreyImage = ConvertToGrey(SrcImage); // Convert to grey image
v1, v2, b : images
v1 = Copy(GreyImage); // Copy image
SetZero(b); // initialize image to value of 0
for (s=1; s <= S ; s++) // Perform total of S steps
{
    Decide_Kernel_Size ( ); // Minimum of 3 to maximum of 85
    MakeGaussianFilter (nKernelSize); // Create Gaussian filter
    v2 = GaussianFilter (v1, GFilter); // Apply Gaussian filter
    // Accumulate additional values of differences between
    pixels before and after application
    b+ = (v1 – v2) / (coeff + v1);
    v1 = Copy(v2)
}
// Create final image based on calculated image b, original
grey image, and critical image
FinalImage = Threshold(b, GreyImage, fThresValue);
```

The step of applying the Gaussian filter S303 will be described with reference to FIG. 4.

Figure 4:
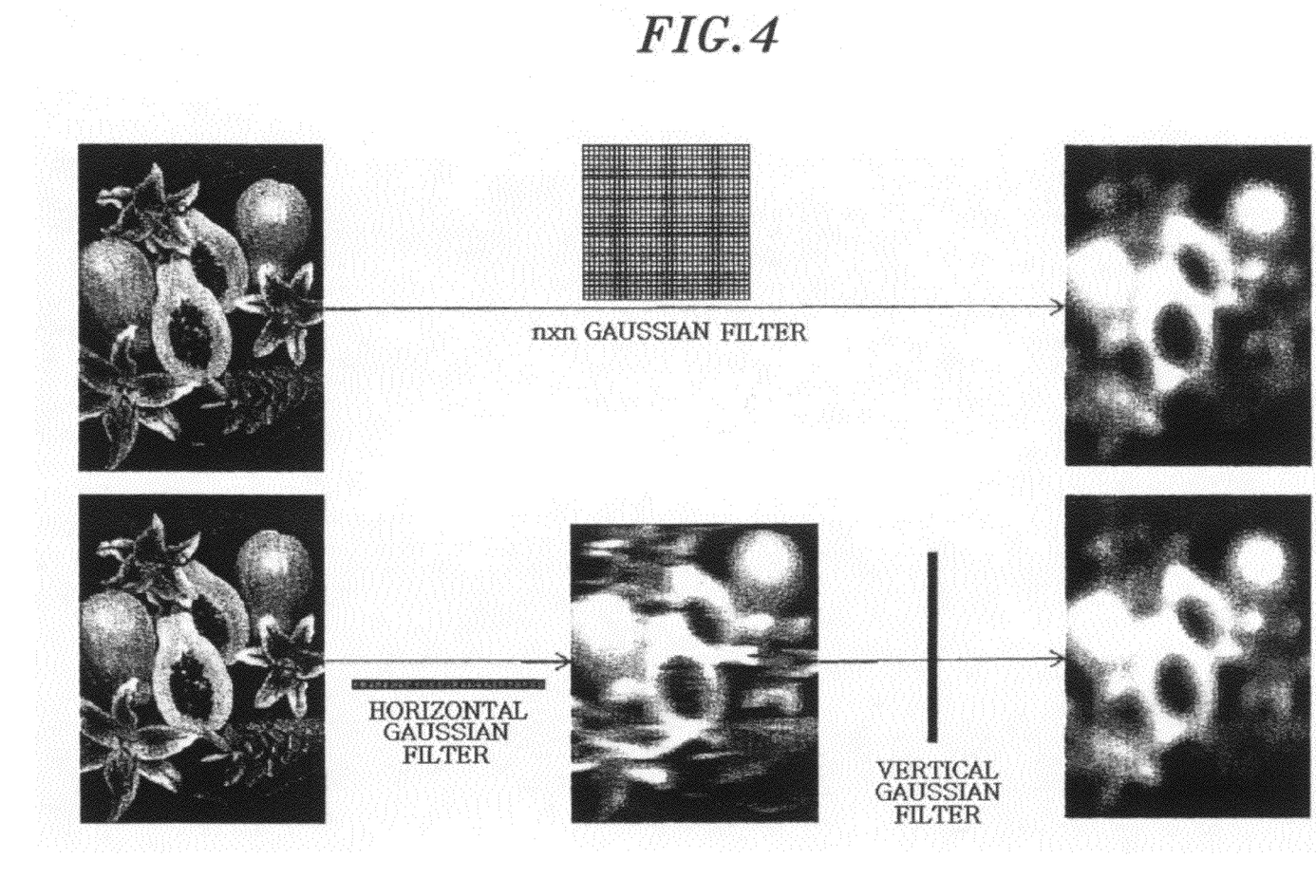
FIG. 4 is a view illustrating steps of operating a two-pass Gaussian filter through reanalysis of the Gaussian function for improving the speed of the pen style transformation technology in realization of artistic transformation effects.

FIG. 4 is a view illustrating steps of operating a two-pass Gaussian filter through reanalysis of the Gaussian function for improving the speed of the pen style transformation technology in realization of artistic effects.

An example of the pen style transformation technology in accordance with the embodiment of the present invention is application of an n by n Gaussian filter and the two-pass Gaussian blur filter to an existing pen style transformation technology.

When the Gaussian function expressed in the form of an exponential function is as follows.

$$f(x) = c\exp\left(-\frac{x^2}{2\sigma^2}\right) \quad \text{[Equation 1]}$$

In Equation 1, c is a standardized constant that exists within a specific range when the Gaussian function is integrated, and $\sigma^2$ is a variance. When the size of a kernel is designated as n by n, the Gaussian blur filter for obtaining the final color F(x,y) of a specific pixel is as follows.

$$F(x, y) = c^2 \sum_i \sum_j \exp\left(-\frac{(x_i - x_a^2)}{2\sigma^2}\right)\exp\left(-\frac{y_i - y_a^2}{2\sigma^2}\right)I(x_i, y_j) \quad \text{[Equation 2]}$$

The Gaussian blur filter applied to the embodiment of the present invention is a variable filter whose kernel size is defined as n by n (where, n is an integer ranging from 3 to 87). As such, the size of an input image is defined by l×m and $n^2 \cdot l \cdot m$ ranges from $3^2 \cdot l \cdot m$ to $87^2 \cdot l \cdot m$. In this case, $n^2$ calculation is spent for each pixel. The present invention uses the fact that the Gaussian function may be arithmetically separated into two passes, a horizontal and a vertical. First, an intermediate value I(x,y) is calculated by applying the horizontal Gaussian blur filter, and then a final value F(x,y) is calculated by applying the vertical blur filter. The intermediate value I(x,y) and the final value F(x,y) are expressed as in Equation 3.

$$I(x, y) = c \sum_i \exp\left(-\frac{(x_i - x_a^2)}{2\sigma^2}\right)I(x_i, y_i) \quad \text{[Equation 3]}$$

$$F(x, y) = c \sum_j \exp\left(-\frac{(y_i - y_a^2)}{2\sigma^2}\right)I(x_i, y_i)$$

In this case, two-pass Gaussian functions are carried out for an input image, but since the number of calculations performed for each pixel is n, the total amount of calculations is 2(n·l·m). For example, when the size of an input image is 640×480 and the maximum size n of a kernel is 85 in the prior art, 85²×640×480, i.e. approximately 2.2 billion calculations are necessary. However, when the two-pass Gaussian filter is applied, 2×85×640×480, i.e. approximately 50 million calculations are necessary, reducing the number of calculations to the maximum of 1/40 of the prior art.

Figure 5:
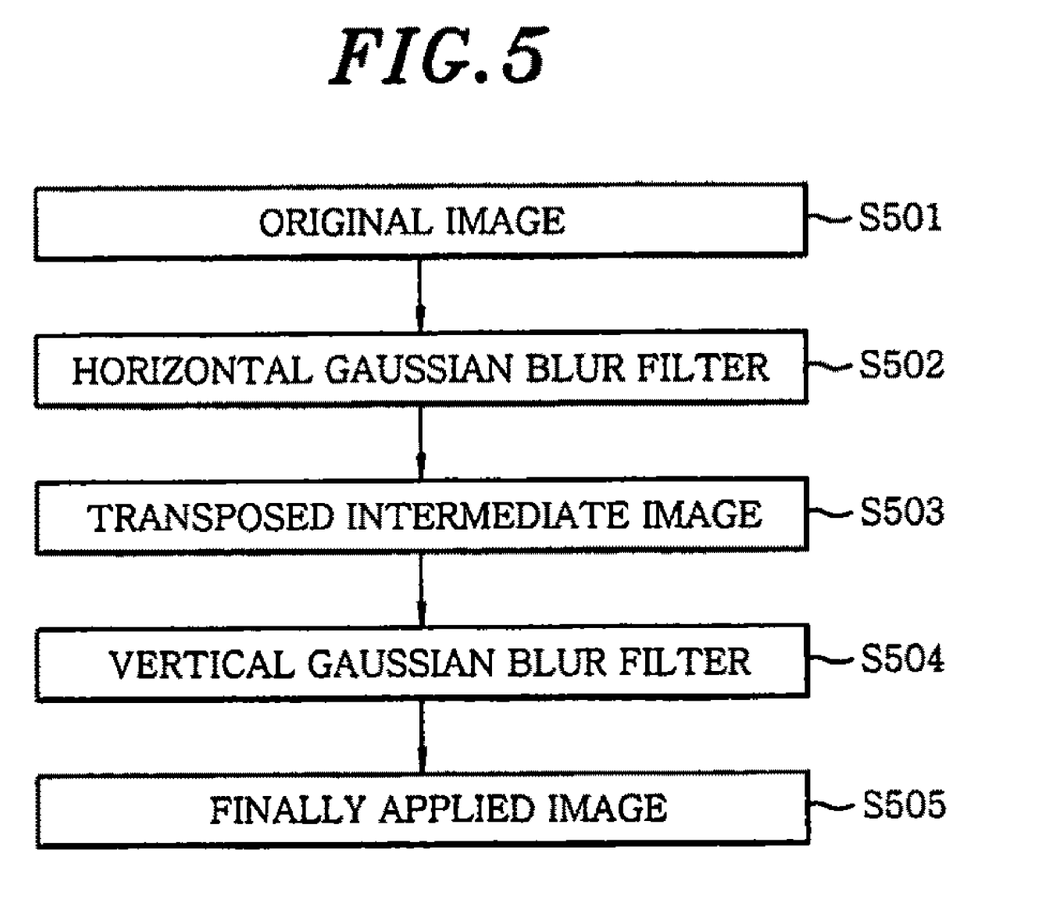
FIG. 5 is a flowchart illustrating a procedure of maintaining localization of a memory for a program to improve efficiency in pen stylization in realization of artistic transformation effects.

FIG. 5 is a flowchart illustrating a procedure of maintaining localization of a memory for a program to improve efficiency in pen stylization in realization of artistic transformation effects.

As in FIG. 5, if an original image is input (S501), the horizontal Gaussian filter is applied first (S502). The result obtained by applying the horizontal Gaussian filter is stored in an intermediate image obtained by transposing the size of a memory space (S503), applied the vertical Gaussian filter to the intermediate image (S504) and a finally blurred image is created (S505). In other words, the pen style transformer 206a sets a temporary memory space having the size (m×l) obtained by transposing the rows and columns of the original image having the size (l×m), and after transposing the rows and columns of the intermediate value (intermediate image), the transposed intermediate image is stored in the temporary memory space. Then, the final value (final image) is created by applying the vertical Gaussian blur filter to the intermediate value stored in the temporary memory space in the row direction.

A cache memory is applied to the CPU to enhance performance speed. Data that are to be used by the CPU are read by the cache memory in advance to reduce the number of times to access the main memory, thereby enhancing performance. When the data necessary for the CPU is in the cache memory (this case is referred to as "cache hit"), performance is enhanced, or otherwise (this case is referred to as "cache failure"), the data need to be read from the main memory. Then, the CPU is in an idle state, causing lowering of operation efficiency. In other words, the cache hit ratio needs to be increased in order to improve performance. One of the methods of increasing the cache hit ratio is to maintain localization of data. Localization of data is achieved by optimally condensing data used together in a physical space of a memory unit and reading the data when the data is read from the main memory to the cache memory.

In storing an image of l×m, the memory unit does not store it on a two-dimensional plane but on a one-dimensional line. In this case, address mapping is used, and usually a row priority storage method is used. In the row priority storage method, pixels (x,y) and (x+1,y) are stored side by side. However, (x,y) and (x,y+1) are adjacent in the two-dimensional array, but actually are stored far away from each other. This is opposite to the column priority storage method. In the case of the conventional Gaussian blur filter, it is difficult to maintain localization of data when pixels are vertically accessed.

Figure 6:
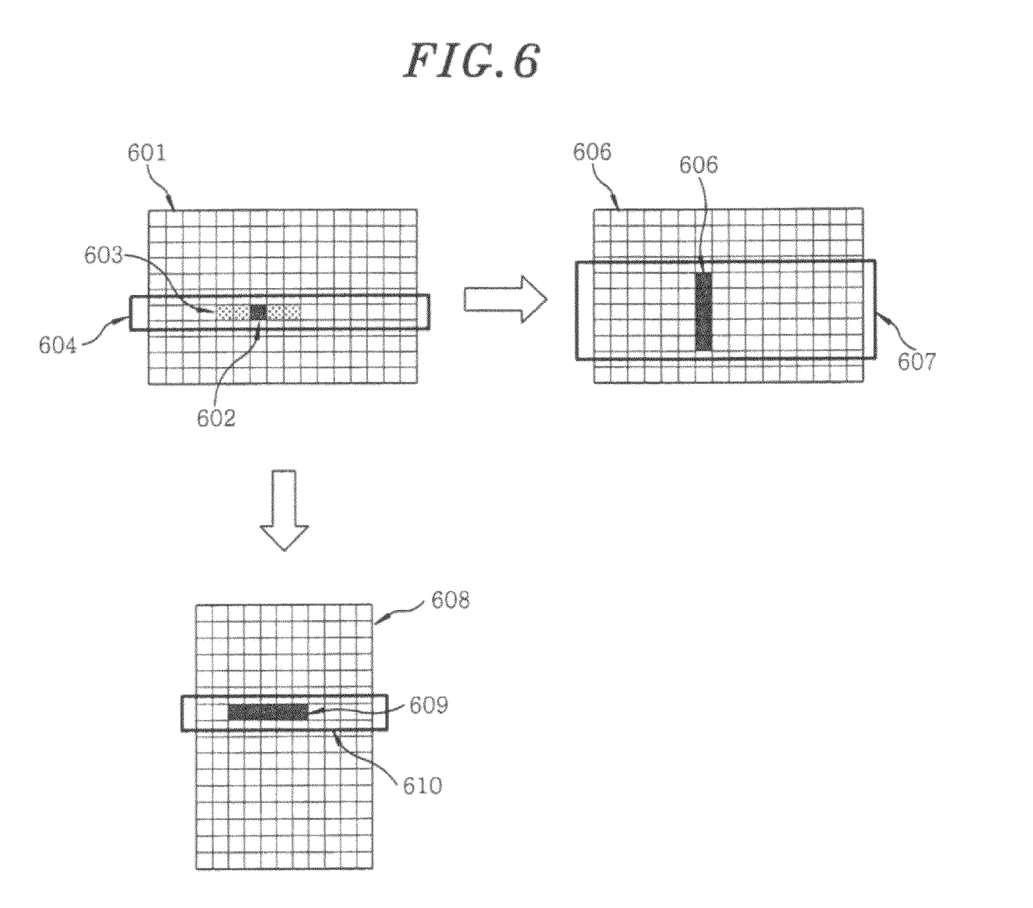
FIG. 6 is a view illustrating a procedure of transposing and storing an intermediate image in FIG. 5.

The two-pass Gaussian blur filter suggested by the present invention also corresponds to the case wherein, when the size of the vertical Gaussian blur filter is 43, the value of a target pixel (x,y) is the total sum of multiplications of weights of the pixels (x,y−21) to (x,y+21), and when the width and color of the input image are 1024 and 24 bits respectively, 3 KB is necessary to store one row. The vertical Gaussian filter needs a cache memory of 152 KB to read data in advance, but since a cache memory of approximately 16 KB is supported, there occur enormous cache misses.

In order to solve this problem, in the two-pass Gaussian blur filter of the present invention, as illustrated in FIG. 6, it is necessary in first pass to apply a horizontal Gaussian blur filter 603 that a row of data 604 in order to obtain the target pixel 602. The size of the temporary memory space for storing the result is not designated according to the original image but the positions of the rows and columns are transposed and stored (608). When the positions of the rows and columns are not transposed (605), five rows of data 607 need to be input to apply the vertical Gaussian blur filter 606, which exceeds the capacity of a restricted cache memory so as not to maintain localization of a memory. Otherwise, when the size of an input image 601 is l×m, the size of an intermediate memory space (temporary storage space) is designated as m×l (608) and when a target pixel (x,y) is calculated and stored, it is stored as (y,x) i.e., the transposed intermediate image is stored in the intermediate memory space. In the case of applying the vertical Gaussian filter in second pass, even if the filter is horizontally applied (609) from the pixel (x−n,y) to the pixel (x+n,y), the same effect is obtained as applying the filter vertically, thereby maintaining localization of data.

Figure 7:
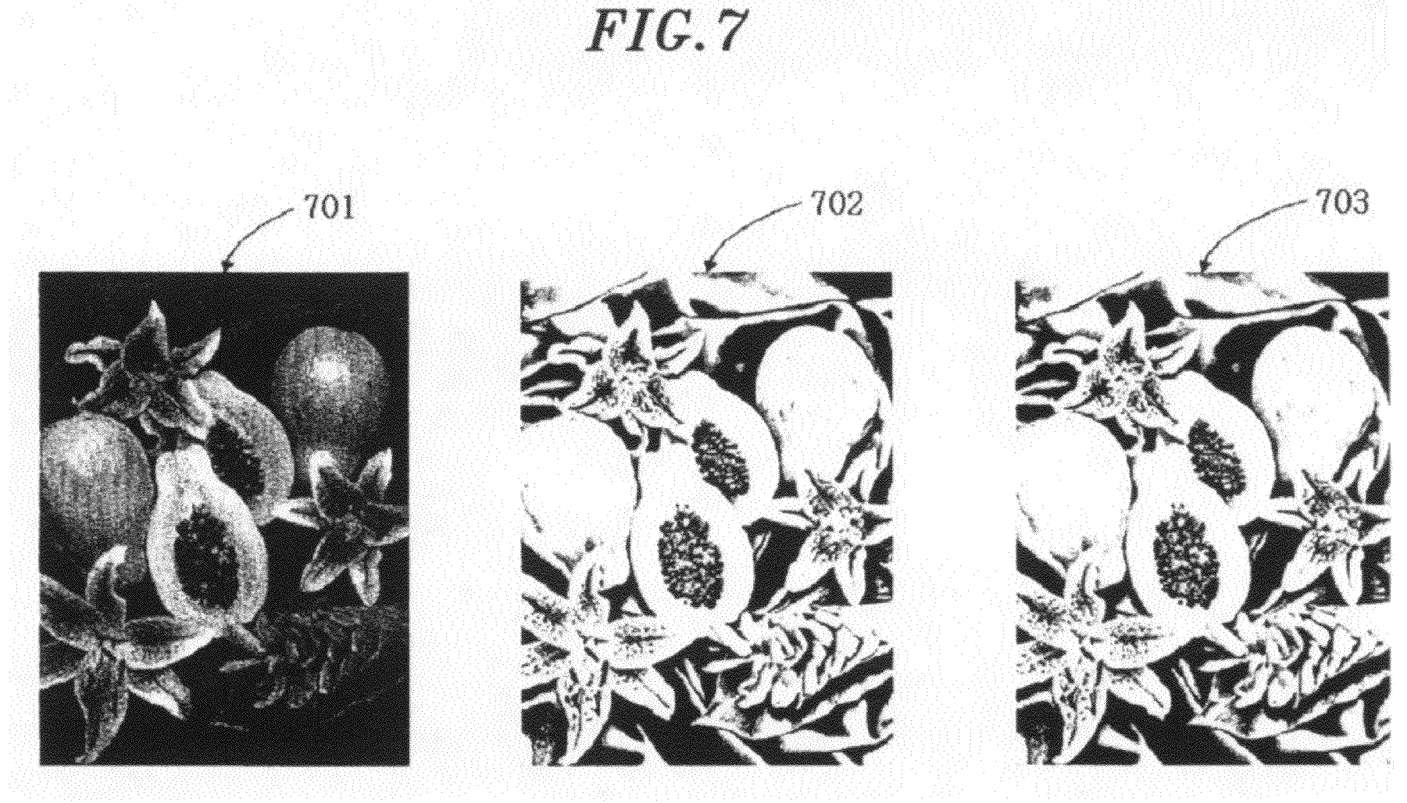
FIG. 7 is a view illustrating result images obtained by comparing a conventional pen stylization algorithm with a pen stylization algorithm deformed in accordance with a mobile environment.

FIG. 7 is a view illustrating result images obtained by comparing a conventional pen stylization algorithm with a pen stylization algorithm deformed according to a mobile environment. FIG. 7 shows that the result images have similar quality. In FIG. 7, the reference numeral 701 is an original image, 702, the result of an n×n Gaussian filter, and 703, an image obtained by applying the two-pass Gaussian filter in accordance with the present invention.

Figure 8:
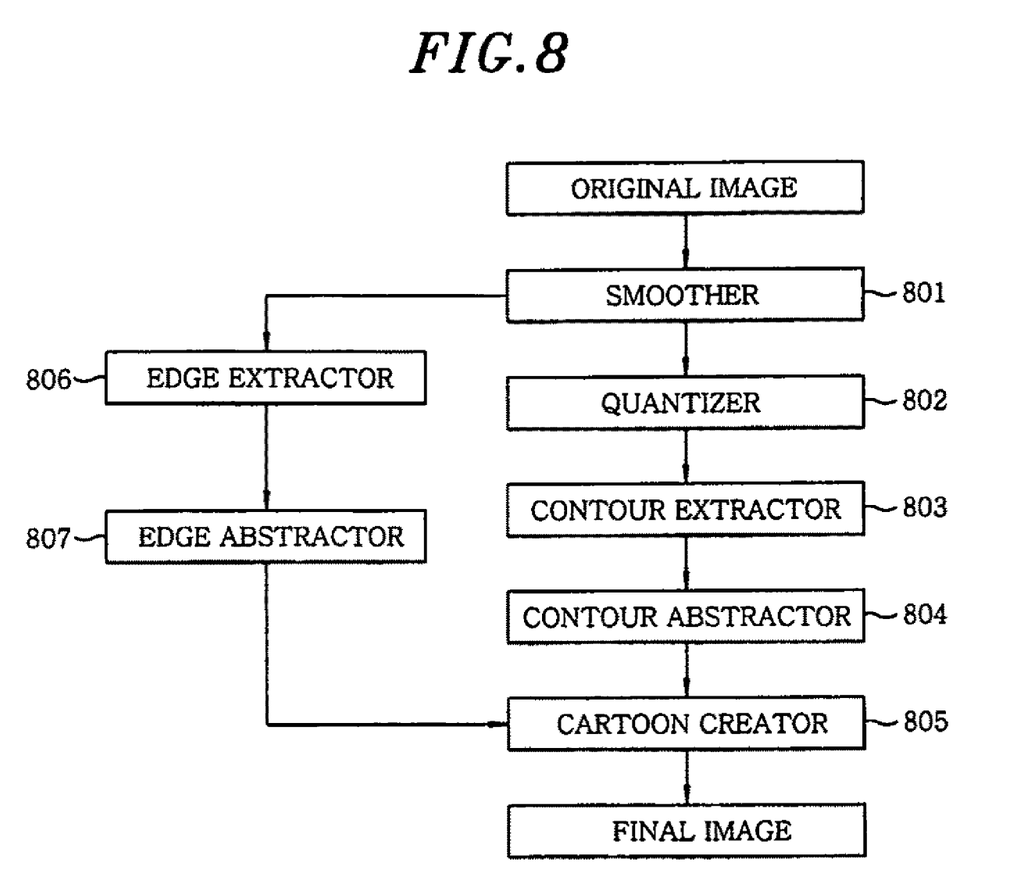
FIG. 8 is a functional block diagram illustrating the internal structure of a cartoon style transformation unit creating a cartoon style image in realization of artistic transformation effects.

FIG. 8 is a block diagram illustrating the internal structure of a cartoon style transformation unit creating a cartoon style image in realization of artistic transformation effects. The cartoon style transformation unit includes a smoother 801, a quantizer 802, an edge extractor 806, a contour extractor 803, a contour abstractor 804, a cartoonizer 805, and an edge abstractor 807.

The smoother 801 smoothes the color of an input image by utilizing a fast bilateral filter. When a space is divided with reference to intensities at respective portions of the input image, the smoothing is performed in order to smoothly separate the borders of the divided spaces.

The quantizer 802 carries out quantization according to the intensities of respective portions in the smoothed image. The quantization may be divided into several levels according to an input of the user, and the quantization level of the image is determined according to the user's input value. The contour extractor 803 extracts a contour with respect to a color region separated from the quantized image.

The contour abstractor 804 abstracts the extracted contour according to the input level of the user. The cartoon creator 805 creates the final cartoon image using the abstracted contour information and the original image.

If the user wants to add contour edges to the final image, the final image is created by additionally applying edge information, that is, by adding an edge effect. In other words, the final image is created by combining an extracted and abstracted edge image created in advance with a cartoon image.

Figure 9:
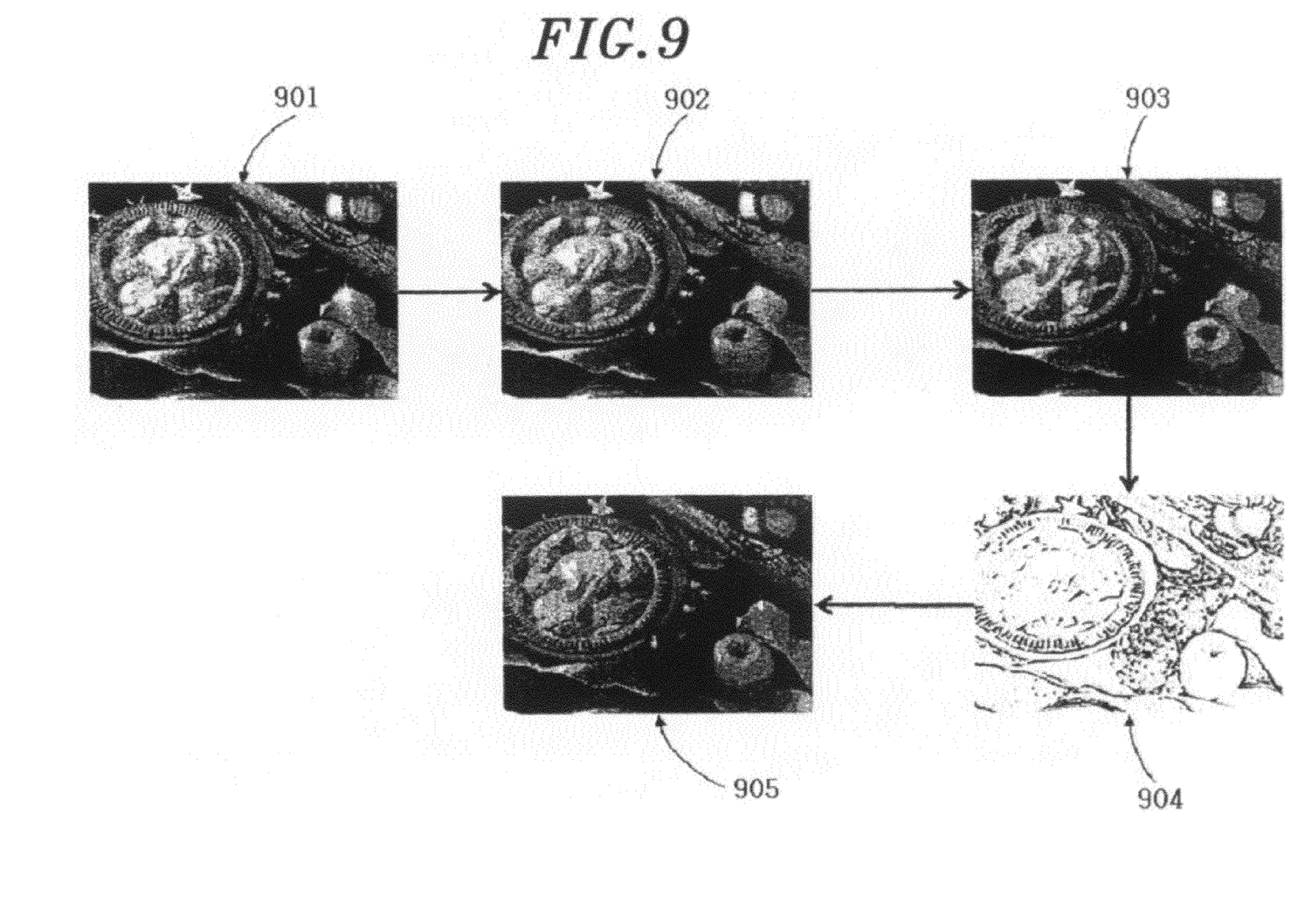
FIG. 9 is a view illustrating a procedure of creating a cartoon style image applied to the embodiment of the present invention step by step.

FIG. 9 is a view illustrating a procedure of creating a cartoon style image applied to the embodiment of the present invention step by step with reference to an intermediate image. If an original image 901 is input, the color of the original image is smoothed (902) and a cartoon image 903 obtained by carrying out quantization and contour abstraction is created based on the smoothed image. If the user designates an edge to be added, an edge image is created (904) and is integrated with a cartoon image to create a final result 905.

Figure 10:
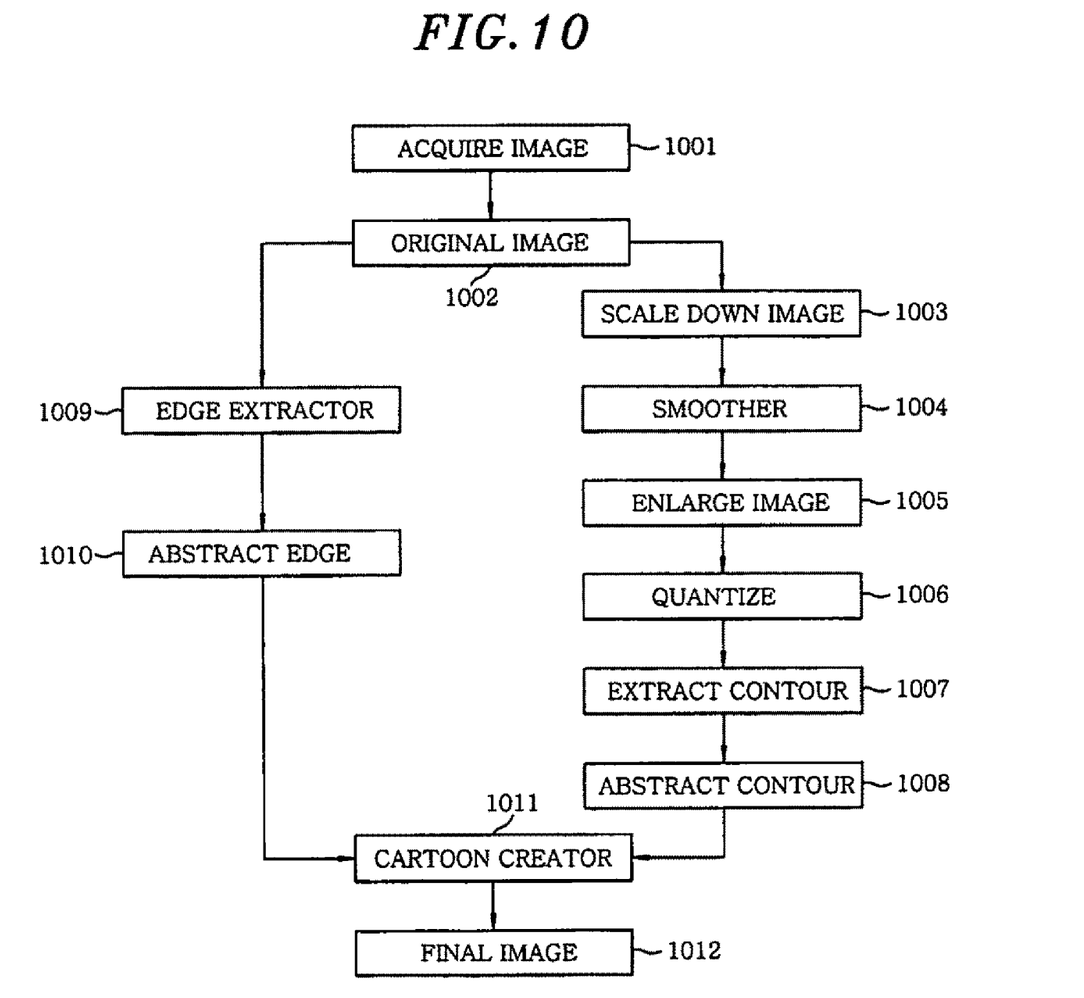
FIG. 10 is a flowchart illustrating a procedure of accelerating the speed of a cartoon style image in realization of artistic transformation effects.

FIG. 10 is a flowchart illustrating a logical procedure of accelerating the speed of a cartoon style image creation in realization of artistic transformation effects.

As illustrated in FIG. 10, an image is acquired using a camera 1001, and an original image 1002 is reduced at a designated ratio 1003. Then, a smoothing operation 1004 is carried out based on the scale-downed image. The smoothed image is reduced to the original size 1005, and then a quantization operation 1006 is carried out. Then, the contour is extracted 1007, and a contour abstracting operation 1008 is carried out. If the operation of drawing an edge is designated, the edge is extracted 1009 and an edge abstracting operation 1010 is carried out. The final cartoonization operation 1011 is carried out by combining edge information with contour information to finish the final image 1012.

Since the cartoonization operation is carried out in units of pixels, as the size of the image increases, calculation cost also increases, making it difficult to carry out the cartoonization operation in real time. Conventionally, QVGA (320×240) is mainly used, but since a screen module of a VGA level (640×480) is recently being widely distributed, the size of an output image is becoming larger. As a conventional approach, the size of an image may be simply reduced to be processed and then be enlarged when the image is outputted on a screen, which deteriorates the quality of the image. In the present invention, the seven operations of the cartoon style transformation unit 206b of FIG. 8 may be classified into cases in which the size of the original image can be controlled and otherwise cases. Thereafter, the original image is processed to the size of a different image to reconstruct the final image again.

Figure 11:
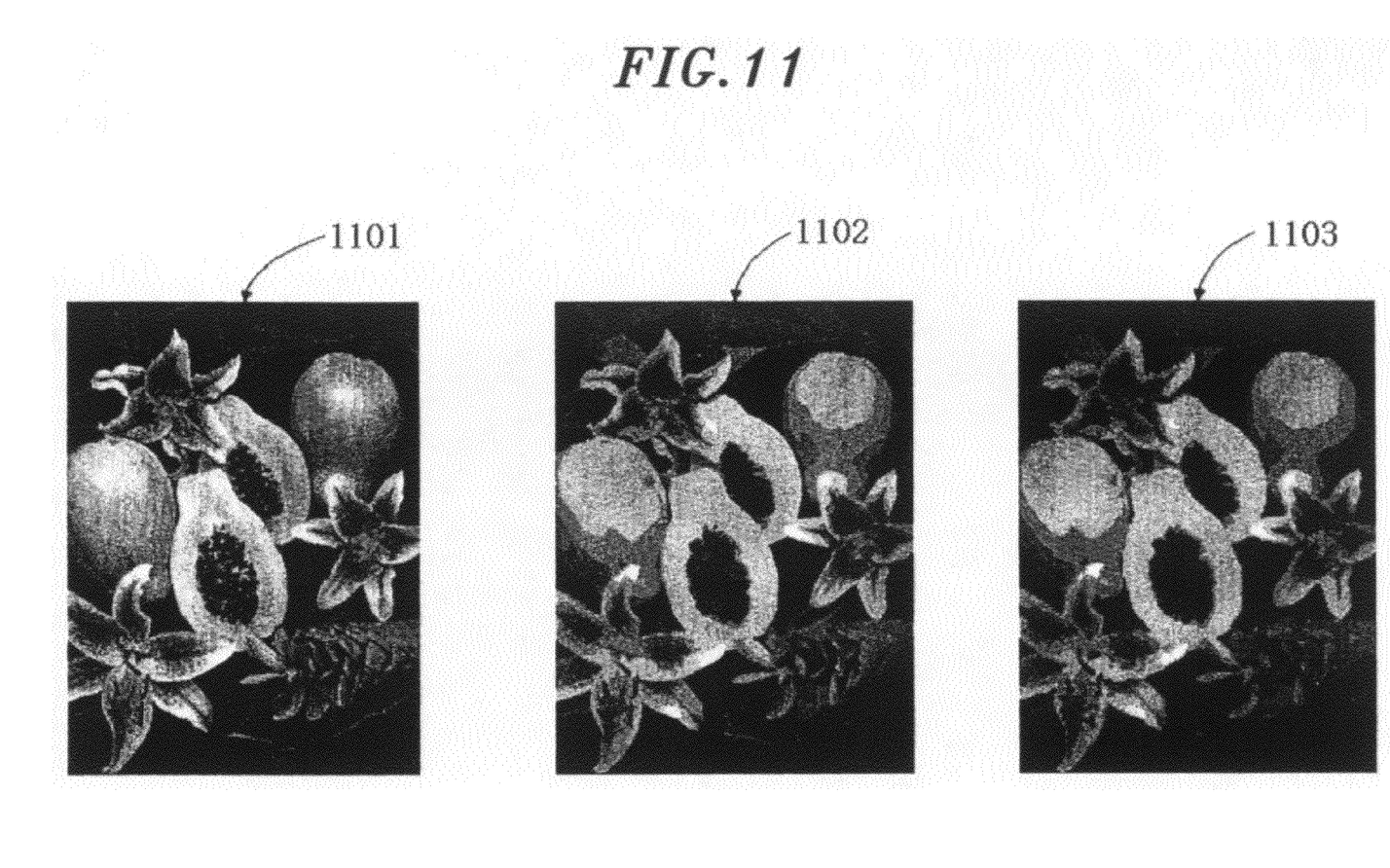
FIG. 11 is a view illustrating a result obtained by comparing the case in which the size of an original image is readjusted and the otherwise case in creation of a cartoon style image in realization of artistic transformation effects.

FIG. 11 is a view illustrating a result obtained by comparing the case in which an original image is resized and the otherwise case in creation of a cartoon style image in realization of artistic transformation effects. In FIG. 11, 1011 refers to an original image, 1102, a cartoon style image obtained by fixing the size of the original image, and 1103, a cartoon style image obtained by scaling down the size of the original image to 25% thereof. It can be seen that there is no difference between the qualities of images.

Figure 12:
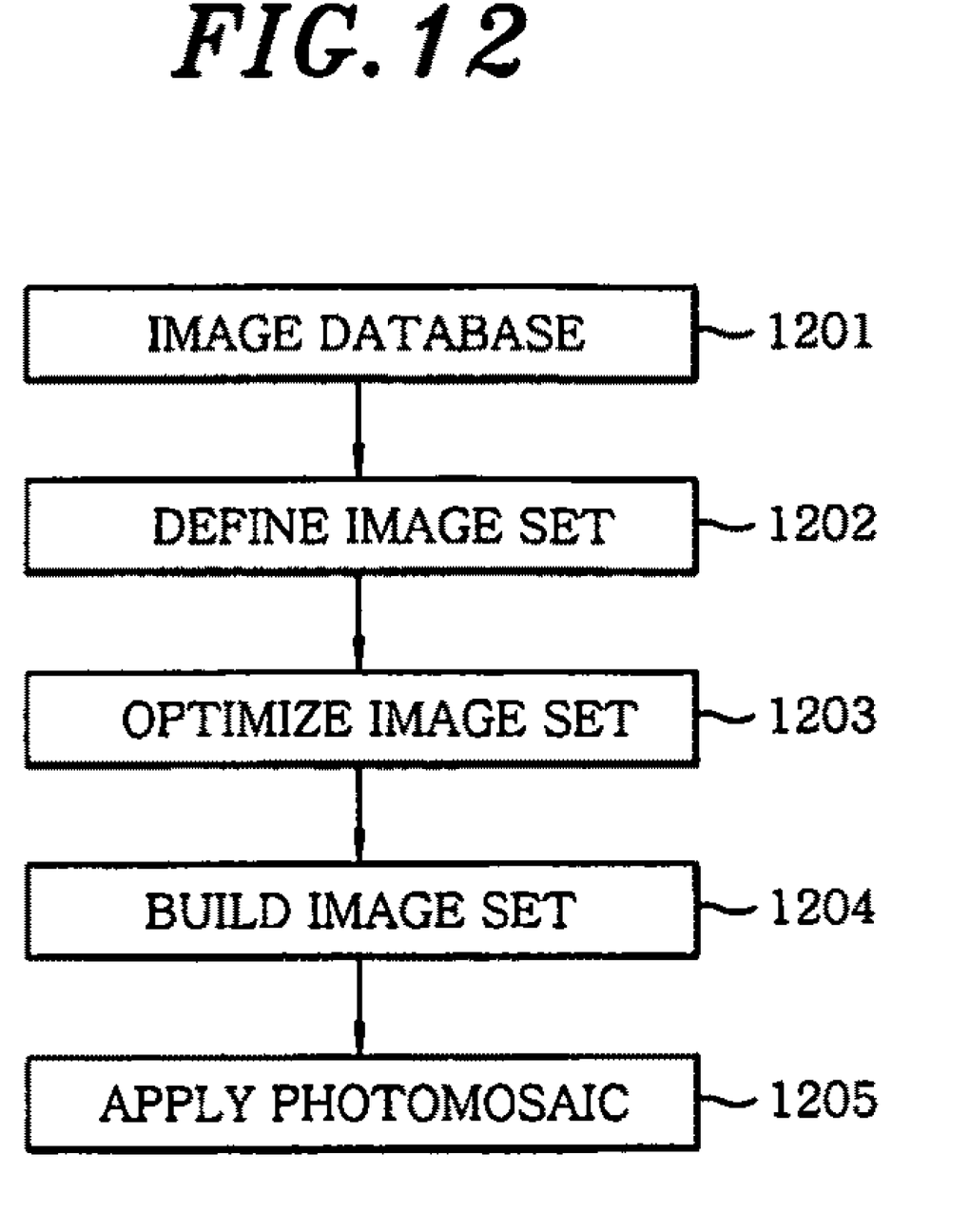
FIG. 12 is a flowchart illustrating a procedure of optimizing an image database used in a photo mosaic function in realization of artistic transformation effects.

FIG. 12 is a flowchart illustrating a procedure of optimizing an image database used in a photo mosaic function in realization of artistic transformation effects.

In general, the photomosaic technology uses as many images as possible. However, this technology increases the cost for search for an image and the memory space cost for storage of an image, which is not acceptable in the mobile device of the present invention. In order to overcome this shortcoming, an optimization operation for extracting a subset most necessary in an image set is inevitably necessary. In the present invention, an optimum image set is created by building an optimization operation for extracting an image subset to be used in creation of a photo mosaic. The entire image is stored in an image database (1201) and the image database (1201) defines the entire image set in the image database (1202). An optimum image set is extracted through a characteristic image extraction optimization technology (1203) to construct the optimum image set with the extracted image (1204). The photomosaic effect is applied using the optimum image set (1205).

In other words, the mosaic creator 206c of the mobile device in accordance with the present invention stores only an optimum image set, and creates a photo mosaic that is to be applied to the original image to apply the photomosaic to the original image.

Figure 13A:
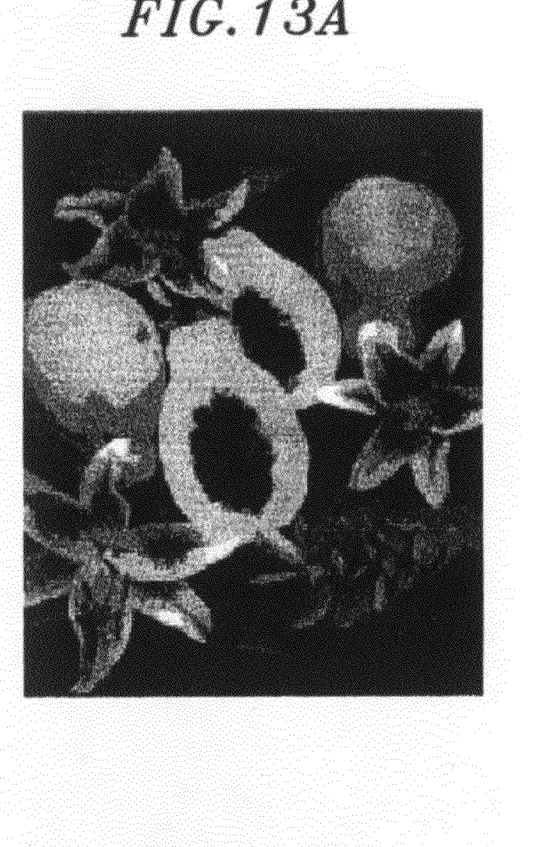
FIGS. 13a to 13f are views illustrating images created by mobile based artistic transformation effects.
Figure 13B:
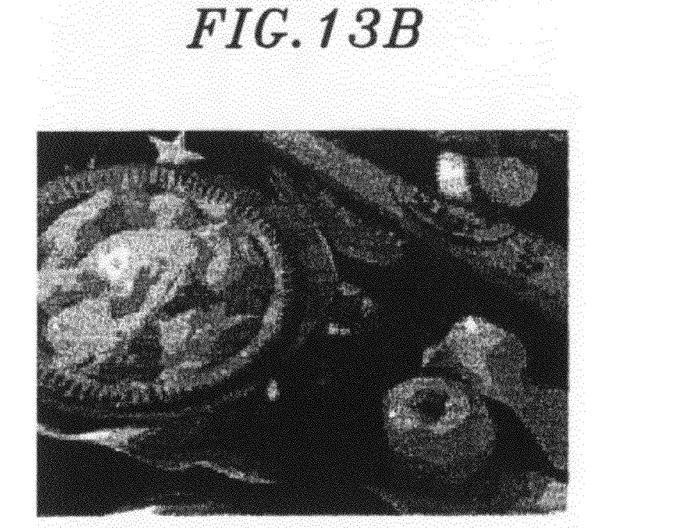
Figure 13C:
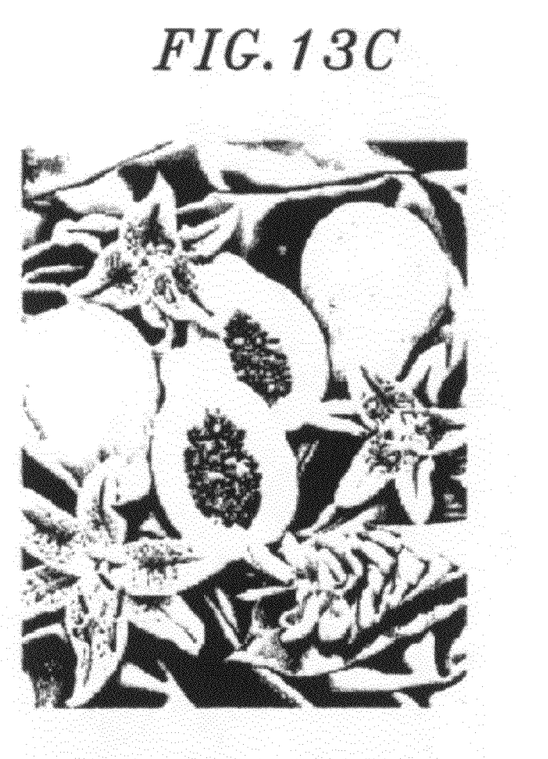
Figure 13D:
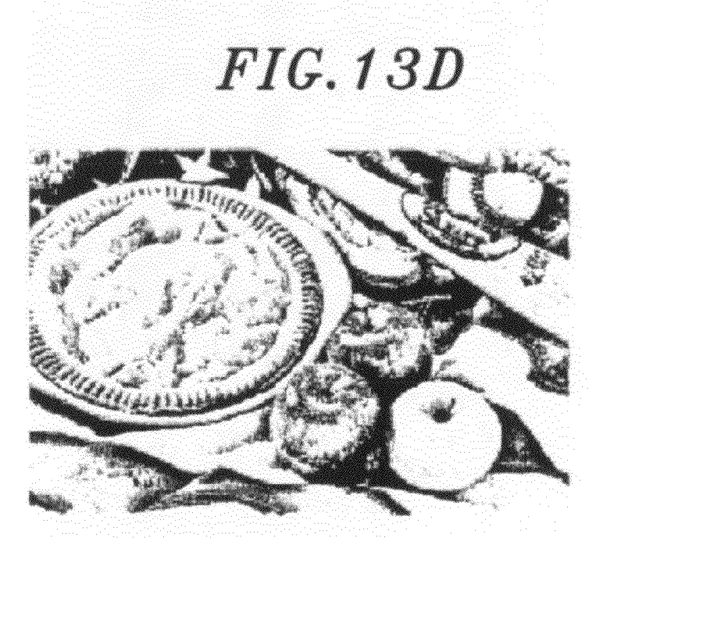
Figure 13E:
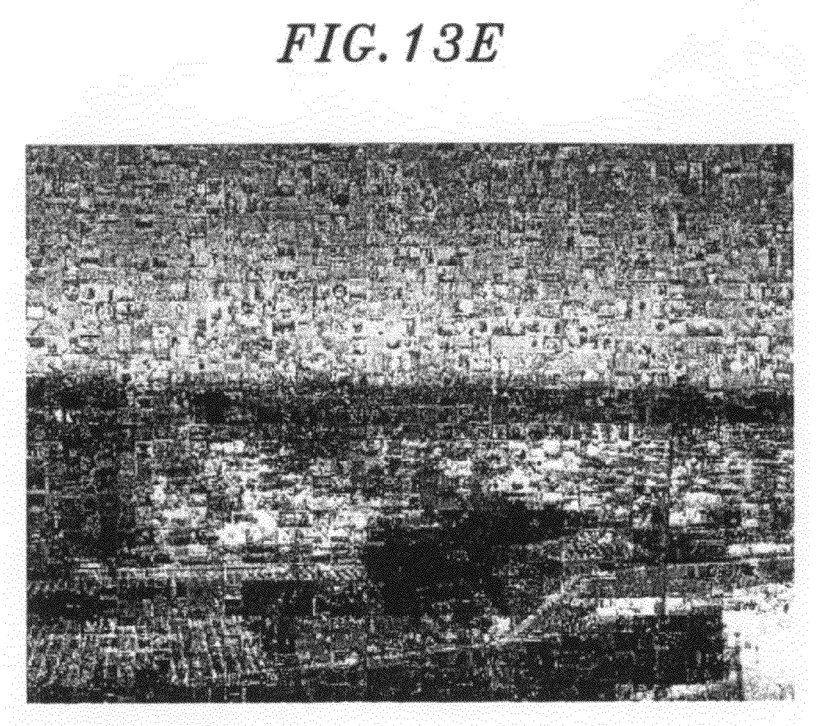
Figure 13F:
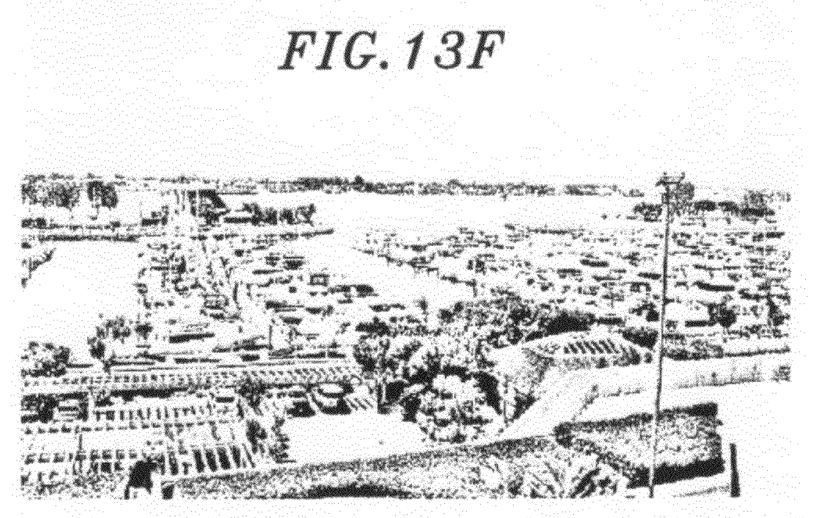

The final images output from the image transformation unit 206 in the mobile device of the present invention, i.e. a pen style transformation image, a cartoon style transformation image, and an image to which the photomosaic is applied, are illustrated in FIGS. 13a to 13f. That is, FIGS. 13a and 13c illustrates a cartoon style image created using the original image, FIGS. 13b, 13d, and 13f, a pen style transformation image to which the two-pass Gaussian filter is applied, and FIG. 13e, an image to which the photo mosaic is applied.

While the invention has been shown and described with respect to the embodiments, it will be understood by those skilled in the art that the system and the method are only examples of the present invention and various changes and modifications may be made without departing from the scope of the invention as defined in the following claims.

What is claimed is:

1. An apparatus for transforming an image in a mobile device, the apparatus comprising:
    a pen style transformation unit for transforming an original image to a pen style image which is drawn by a pen using a separated Gaussian filter and outputting the pen style image;
    a cartoon style transformation unit for transforming the original image to a cartoon style image having characteristics of a cartoon and outputting the cartoon style image;
    a mosaic creation unit for creating a photo mosaic of images in a mosaic pattern to which the original image is applied based on an optimum photo image set and outputting the created photo mosaic by applying the created photo mosaic to the original image; and
    an image output unit for outputting the images output from the pen style transformation unit, the cartoon style transformation unit, and the mosaic creation unit to an output unit.

2. The apparatus of claim 1, wherein the separated Gaussian filter includes a horizontal Gaussian blur filter and a vertical Gaussian blur filter.

3. The apparatus of claim 2, wherein the pen style transformation unit includes:
    a means for calculating an intermediate value by applying the horizontal Gaussian blur filter to the original image; and
    a means for calculating a final value by applying the vertical Gaussian blur filter to the intermediate value.

4. The apparatus of claim 3, wherein the pen style transformation unit includes:
    a temporary memory space having rows and columns of a size of m by l obtained by transposing rows and columns of a size of l by m of the original image;
    a means for storing in the temporary memory space a transposed intermediate value obtained by transposing the rows and columns of the intermediate value; and
    a means for calculating the final value by applying the vertical Gaussian blur filter in a direction of the rows of the temporary memory space to the transposed intermediate value.

5. The apparatus of claim 1, wherein the cartoon style transformation unit includes:
    a smoother for smoothing the original image;
    a quantizer for quantizing the smoothed original image and reducing the number of distinct colors used in an smoothed image thereof;
    a contour extractor for extracting contours of spaces for the colors;
    an abstractor for abstracting key features of the contours extracted by the contour extractor; and
    a cartoonizer for creating a cartoon image using information about the abstracted contours and information about the original image and for outputting the created cartoon image to the output unit.

6. The apparatus of claim 5, wherein the cartoon style transformation unit further includes:
    an edge extractor for extracting edge information from the smoothed image, and
    wherein the cartoonizer combines the edge information with the cartoon image and outputs the cartoon image combined with the edge information to the image outputter.

7. The apparatus of claim 6, the cartoon style transformation unit further includes:
    an edge abstractor for abstracting key features of the edge shape extracted by the edge extractor, and
    wherein the cartoon style transformation unit combines the abstracted edge information with the cartoon image and outputs the cartoon image combined with the abstracted edge information to the image output unit.

8. The apparatus of claim 5, wherein the smoother reduces the original image at a specific ratio and then smoothes the original image.

9. The apparatus of claim 8, wherein the quantizer restores a size of the smoothed image to a size of the original image, and then quantizes the smoothed original image.

10. The apparatus of claim 1, wherein the optimum photo image set is a set of images extracted from an image set for creation of an entire mosaic through a featured image optimizing technology.

* * * * *